US010408416B2

(12) United States Patent
Khorasaninejad et al.

(10) Patent No.: US 10,408,416 B2
(45) Date of Patent: Sep. 10, 2019

(54) ACHROMATIC METALENS AND METALENS WITH REVERSE CHROMATIC DISPERSION

(71) Applicant: PRESIDENT AND FELLOWS OF HARVARD COLLEGE, Cambridge, MA (US)

(72) Inventors: Mohammadreza Khorasaninejad, Belmont, MA (US); Zhujun Shi, Cambridge, MA (US); Alexander Y. Zhu, Cambridge, MA (US); Wei Ting Chen, Medford, MA (US); Vyshakh Sanjeev, Whitby (CA); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 15/885,622

(22) Filed: Jan. 31, 2018

(65) Prior Publication Data
US 2018/0216797 A1 Aug. 2, 2018

Related U.S. Application Data

(60) Provisional application No. 62/452,912, filed on Jan. 31, 2017.

(51) Int. Cl.
| *G02B 5/18* | (2006.01) |
| *B82Y 20/00* | (2011.01) |
| *B82Y 40/00* | (2011.01) |
| *G01B 9/02* | (2006.01) |
| *F21V 5/00* | (2018.01) |

(Continued)

(52) U.S. Cl.
CPC ............ *F21V 5/004* (2013.01); *B82Y 40/00* (2013.01); *F21K 9/64* (2016.08); *F21V 5/045* (2013.01); *F21V 5/046* (2013.01); *F21V 5/10* (2018.02); *G02B 5/1809* (2013.01);
(Continued)

(58) Field of Classification Search
CPC .... G02B 5/1809; G02B 5/1876; B82Y 20/00; B82Y 40/00; F21V 5/004; F21V 5/045; F21V 5/046; F21V 5/10; F21K 9/64
See application file for complete search history.

(56) References Cited

U.S. PATENT DOCUMENTS 9,151,891 B2 * 10/2015 Ma .................... B82Y 20/00
9,298,060 B2 * 3/2016 Shen ................... G02F 1/3501
(Continued)

OTHER PUBLICATIONS

Khorasaninejad, Mohammadreza et al. "Metalenses at visible wavelengths: Diffraction-limited focusing and subwavelength resolution imaging". Applied Optics, vol. 352, Issue 6290, Jun. 3, 2016, pp. 1190-1194. (Year: 2016).*

(Continued)

*Primary Examiner* — Michael A Lyons
(74) *Attorney, Agent, or Firm* — Foley & Lardner LLP; Cliff Z. Liu

(57) ABSTRACT

An optical device includes a substrate, a reflective layer disposed over the substrate, and a metalens disposed over the reflective layer. The metalens includes a plurality of nanopillars, the plurality of nanopillars together specifying a phase profile such that the metalens has a focal length that is substantially constant over a wavelength range of an incident light of about 490 nm to about 550 nm.

16 Claims, 14 Drawing Sheets

(51) Int. Cl.
  *F21K 9/64* (2016.01)
  *F21V 5/04* (2006.01)
  *F21V 5/10* (2018.01)
  *H04N 13/25* (2018.01)

(52) U.S. Cl.
  CPC .......... *G02B 5/1876* (2013.01); *H04N 13/25*
  (2018.05); *B82Y 20/00* (2013.01)

(56) References Cited

U.S. PATENT DOCUMENTS

| | | | |
|---|---|---|---|
| 2016/0306157 A1* | 10/2016 | Rho | G02B 21/361 |
| 2017/0082263 A1* | 3/2017 | Byrnes | F21V 5/045 |
| 2017/0146806 A1* | 5/2017 | Lin | G02B 21/004 |
| 2018/0246262 A1* | 8/2018 | Zhan | G02B 5/1871 |
| 2019/0003892 A1* | 1/2019 | Aieta | G01J 3/30 |
| 2019/0086683 A1* | 3/2019 | Aieta | G02B 1/002 |

OTHER PUBLICATIONS

Dong, Jian-Wen et al. "Zero-index photonic crystal as low-aberration optical lens (Conference Presentation)". Proc. SPIE 9918, Metamaterials, Metadevices, and Metasystems 2016, 991822 (Nov. 9, 2016), available at https://doi.org/10.1117/12.2237137 (Year: 2016).*

Pacheco-Peña, V. et al. "Epsilon-near-zero metalenses operating in the visible". Optics & Laser Technology 80, Jan. 19, 2016, pp. 162-168. (Year: 2016).*

Chen, Zianzhong et al. "Dual-polarity plasmonic metalens for visible light". Nature Communications, Nov. 13, 2012, pp. 1-6. (Year: 2012).*

Khorasaninejad, M. et al. "Achromatic Metalens over 60 nm Bandwidth in the Visible and Metalens with Reverse Chromatic Dispersion". NanoLetters, Jan. 26, 2017, pp. 1819-1824. (Year: 2017).*

* cited by examiner

ACHROMATIC METALENS AND METALENS WITH REVERSE CHROMATIC DISPERSION

CROSS REFERENCE TO RELATED APPLICATIONS

This application claims the benefit of and priority to U.S. Provisional Application No. 62/452,912, filed on Jan. 31, 2017, entitled "Achromatic Metalens and Metalens with Reverse Chromatic Dispersion," which is incorporated by reference herein in its entirety.

STATEMENT OF FEDERALLY SPONSORED RESEARCH OR DEVELOPMENT

This invention was made with Government support under FA9550-14-1-0389 and FA9550-16-1-0156, awarded by the Air Force Office of Scientific Research. The Government has certain rights in the invention.

BACKGROUND

The design principles of diffractive optics date back to microwave devices, where an array of metallic antennas was used to control the radiation pattern of an incident electromagnetic wave. With progress in fabrication techniques, numerous planar devices, such as gratings, lenses, polarization-sensitive devices, and mirrors have been realized in the infrared and visible spectrum. Metasurfaces have added another dimension to diffractive optics by allowing control over the basic properties of light (phase, amplitude and polarization) with subwavelength spatial resolution. One particular device that has attracted a lot of attention is the planar lens (also referred to herein as metalens). Due to their planar configuration, metalenses have potential applications in several multidisciplinary areas including imaging, spectroscopy, lithography, and laser fabrication.

High numerical aperture (NA) and high efficiency lenses have been demonstrated in both near infrared and visible spectrum. It has also been shown that multifunctional metalenses can be achieved without adding design and fabrication complexity. Multi-order diffractive lenses and multiwavelength achromatic metalenses have been reported to compensate for chromatic dispersion at several discrete wavelengths, but achieving achromatic focusing over a significant bandwidth has proven challenging for Fresnel lenses and metalenses. Metalenses are used in a wide variety of applications, in which either an illumination source (e.g. LED imaging) or a signal (e.g. fluorescence and photoluminescence signals) has a substantial bandwidth. Broadband achromatic cylindrical lens in the visible spectrum also exist. However, they have a low numerical aperture (NA=0.013), specify three dimensional fabrication (grayscale lithography), and restrict the constituent materials to resists.

SUMMARY

The present disclosure describes an optical device including a substrate, a reflective layer disposed over the substrate, and a metalens disposed over the reflective layer, where the metalens includes a plurality of nanopillars, the plurality of nanopillars together specifying a phase profile such that the metalens has a focal length that is substantially constant over a wavelength range of an incident light of about 490 nm to about 550 nm. In one or more embodiments, the phase profile of the metalens is such that the focal length of the metalens increases with an increase in the wavelength of the incident light. In one or more embodiments, the nanopillars have a square cross-sectional area. In one or more embodiments, a ratio of a height of the plurality of nanopillars over a width of the plurality of nanopillars is greater than about 1. In one or more embodiments, a center-to-center distance between any two adjacent nanopillars of the plurality of nanopillars is greater than the wavelength range of the incident light. In one or more embodiments, the focal length of the metalens is insensitive to a polarization of the incident light. In one or more embodiments, the optical device further includes a silicon dioxide layer disposed over the reflective layer, where the substrate includes a fused silica layer. In one or more embodiments, a thickness of the reflective layer is about 110 nm, and a thickness of the silicon dioxide layer is about 180 nm.

The present disclosure describes an imaging system including a metalens structure, a beam splitter, and an image sensor. The metalens includes a plurality of nanopillars, the plurality of nanopillars together specifying a phase profile such that the metalens has a focal length that is substantially constant over a wavelength range of an incident light of about 490 nm to about 550 nm. The beam splitter is configured to receive the incident light reflected from the metalens, and reflect the received incident light. The image sensor is positioned to receive the incident light reflected by the beam splitter. In one or more embodiments, the phase profile of the metalens is such that the focal length of the metalens increases with an increase in the wavelength of the incident light. In one or more embodiments, the nanopillars have a square cross-sectional area. In one or more embodiments, a ratio of a height of the plurality of nanopillars over a width of the plurality of nanopillars is greater than about 1. In one or more embodiments, a center-to-center distance between any two adjacent nanopillars of the plurality of nanopillars is greater than the wavelength range of the incident light. In one or more embodiments, the focal length of the metalens is insensitive to a polarization of the incident light. In one or more embodiments, the metalens structure further includes a silicon dioxide layer disposed over the reflective layer, where the substrate includes a fused silica layer. In one or more embodiments, a thickness of the reflective layer is about 110 nm, and a thickness of the silicon dioxide layer is about 180 nm.

DETAILED DESCRIPTION

Figure 1:
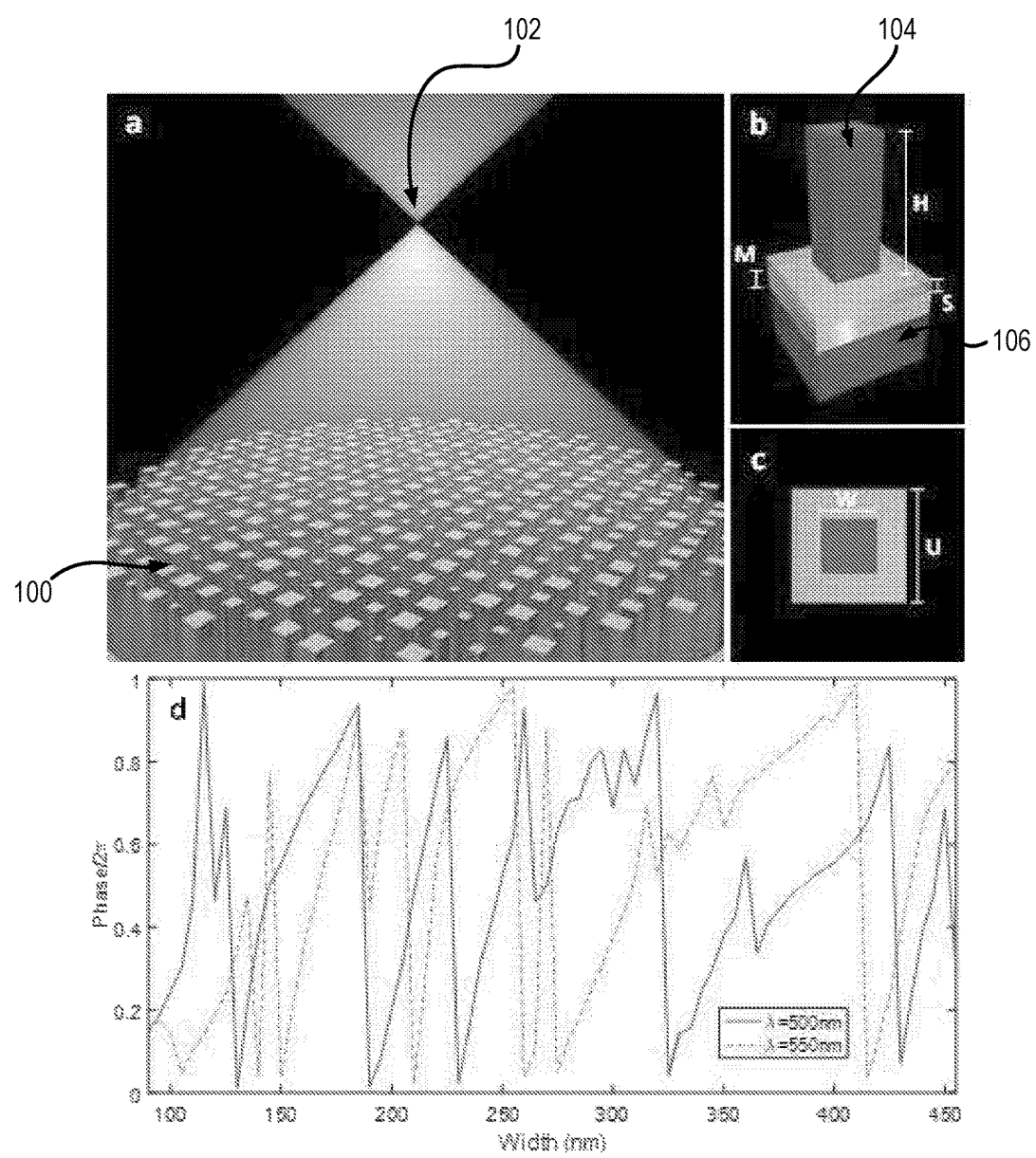
FIG. 1 shows details of an achromatic metalens (AML), in accordance with an embodiment of the present disclosure.

In the description below, some embodiments are directed to a visible wavelength achromatic metalens (AML), which specifies a one-step lithography process, with numerical aperture NA=about 0.2, and a constant focal length over a continuous range of wavelengths, from about 490 nm to about 550 nm. This bandwidth, which is close to that of an LED, allows numerous applications using metalenses.

An achromatic metalens (AML) operating over a continuous bandwidth in the visible spectrum is discussed herein. The AML operation is accomplished via dispersion engineering of dielectric phase shifters, which can include titanium dioxide nanopillars tiled on a dielectric spacer layer above a metallic mirror. The AML, works in reflection mode with a focal length independent of wavelength from about $\lambda$=490 nm to about 550 nm. A metalens with reverse chromatic dispersion is also discussed herein, for which the focal length increases as the wavelength increases, contrary to typical diffractive lenses. The ability to engineer the chromatic dispersion of metalenses at will allows a wide variety of applications that were not previously possible. In particular, for the AML design, applications such as imaging under LED illumination, fluorescence, and photoluminescence spectroscopy can be envisioned.

In some embodiments, an optical device includes a substrate, a reflective layer disposed over the substrate, and a metalens disposed over the reflective layer. The metalens includes a plurality of nanopillars, the plurality of nanopillars together specifying a phase profile such that the metalens has a focal length that is substantially constant over a wavelength range of an incident light of about 490 nm to about 550 nm.

In some embodiments, the phase profile of the metalens is such that the focal length of the metalens increases with an increase in the wavelength of the incident light.

In some embodiments, the nanopillars have a square cross-sectional area. In some embodiments, the nanopillars have cross-sectional areas of other shapes, such as rectangular or other polygonal shape; or circular or elliptical. In some embodiments, the nanofins include a dielectric material. Examples of suitable dielectric materials include metal and non-metal oxides (such as an oxide of aluminum, silicon, hafnium, zinc, magnesium, or titanium), metal and non-metal nitrides (such as nitrides of silicon, boron, or tungsten), metal and non-metal sulfides, and pure elements (e.g., silicon for operation at near-infrared and mid-infrared wavelengths).

In some embodiments, the nanopillars a ratio of a height of the plurality of nanopillars over a width of the plurality of nanopillars is greater than 1, such as at least about 1.5, at least about 2, at least about 3, at least about 4, or at least about 5, and up to about 10 or greater, or up to about 20 or greater.

In some embodiments, a center-to-center distance between any two adjacent nanopillars of the plurality of nanopillars is greater than the wavelength range of the incident light.

Metalens Design

A phase profile to achieve diffraction-limited focusing for collimated incident light can be represented, for example, by Equation (1) below:

$$\varphi(x, y, \lambda) = C(\lambda) - \frac{2\pi}{\lambda}(\sqrt{x^2 + y^2 + f^2} - f) \quad (1)$$

where $\lambda$ is wavelength, f is focal length, and C is a reference phase, which is chosen to be wavelength dependent. Due to the wavelength dependence of the phase, achieving an achromatic lens (fixed focal length over a bandwidth) can be challenging. In refractive lenses, phase is achieved via volumetric propagation and due to low dispersion of the material used (e.g. silica). The chromatic aberration is not pronounced and can be corrected with well-established strategies using multiple lenses. In metasurface-based diffractive lenses, however, the phase is commonly achieved via waveguiding effects or effective medium designs, both of which can involve undesired dispersion. In addition, the interference of light transmitted or reflected from this phase profile is used to focus light. Contributions from both the phase realization process and the interference mechanism can result in large chromatic aberrations in diffractive lenses. In a dielectric-based metalens, each phase shifter (PS), nanopillar, acts as a truncated waveguide with predetermined dispersion. One factor in designing a metalens is optimizing the PS's geometric parameters, such as the diameter, height and center-to-center distance of nanopillars, to achieve a desired phase coverage of 0-2$\pi$. In one or more embodiments, the desired phase coverage can be achieved by varying a geometric parameter, such as the lateral dimension of nanopillars, from a minimum value to a maximum value.

In some embodiments, the fabrication constraints in making high aspect ratio nanopillars (small diameter, large height H that is kept constant across the metalens for fabrication reasons) can make it difficult to extend the phase coverage beyond 2$\pi$. This limits the options for selecting the phase at a given wavelength, which translates into a specific geometric design parameter. This implies that in the selection of an appropriate PS at a design wavelength, one often cannot simultaneously satisfy the desired phase at other wavelengths. The PS can be designed such that it not only provides multiple 2$\pi$ phase coverage, but also provides anomalous dispersion—both of which offer extra degrees of freedom for designing the AML.

FIG. 1 shows details of an achromatic metalens (AML), in accordance with an embodiment of the present disclosure. In particular FIG. 1(a) shows a schematic of the example AML 100. The AML 100 focuses a collimated incident light into a spot 102 in reflection mode. FIG. 1(b) shows that the building blocks of the AML 100 include a titanium dioxide (TiO$_2$) nanopillar 104, with height H=600 nm, on a substrate 106. The nanopillar 104 has a square cross-section with width W. By adjusting the width, the reflection phase can be controlled. The substrate 106 is an aluminum-coated fused silica with a thin film of silicon dioxide deposited on top. Aluminum and silicon dioxide have thicknesses M=110 nm and S=180 nm, respectively. FIG. 1(c) shows a top-view of the building block shown in FIG. 1(b), and shows the width of $TiO_2$ nanopillar 104 with unit cell size U=480 nm. In one or more embodiments, as shown in FIGS. 1(a) and 1(b), the PS of the AML 100 can be a titanium dioxide ($TiO_2$) nanopillar 104 (with a square cross-section) on a metallic mirror with a thin layer of silicon dioxide (spacer) in-between. Amorphous silicon nanopillars can be used to design achromatic lenses in the near infrared. The phase coverage can be improved by optimizing the nanopillars' parameters, such as cross-section shape (square in our case), width, center-to-center distance, and height.

One advantage of using a square cross section of the nanopillar 104 is that it maximizes a filling factor range: from zero (no nanopillar) to ~1 (where width equals to center-to-center distance), which increases the phase coverage. In addition, the square cross section provides polarization insensitive operation of the AML 100. The nanopillar 104 width is another parameter that can be considered for optimization. While the smallest achievable width (for example 80 nm in the embodiment represented in FIGS. 1(a)-(d)) is limited by fabrication constraints, the largest achievable width is less than the center-to-center distance between neighboring nanopillars. Center-to-center distance U defines the sampling rate of the phase profile (Equation (1)) and satisfies the Nyquist sampling criterion (U<$\lambda$/2NA). Additionally, to excite a guided mode resonance responsible for anomalous dispersion of the PSs (as discussed below in section entitled "Guided Resonance Mode"), the center-to-center distance can be larger than substantially all wavelengths (across the design bandwidth) in the $TiO_2$. This distance however can also be smaller than substantially all wavelengths (across the design bandwidth) in free space to suppress higher diffraction orders. In some embodiments, a center-to-center distance to be U=480 nm can be selected. Regarding the nanopillar 104, the larger the height H, the greater the phase coverage. In some embodiments, such as the one represented in FIGS. 1(a)-(d), H can be limited by fabrication constraints to 600 nm. The AML 100 can be designed to operate in reflection, which has the advantage of increasing the overall phase coverage (longer optical path).

FIG. 1(d) shows the phase shift as function of the width of the PS at two different wavelengths (500 nm and 550 nm). Note that the phase is folded between 0 to $2\pi$. For each wavelength, several choices of widths are available that provide the same phase, but have different dispersive responses. For example, at the wavelength of 500 nm, there are multiple widths that give the same phase (module of $2\pi$), but these widths provide different phases at the wavelength of 550 nm. In addition, contrary to previous metalens designs, the unfolded phase shift as a function of the nanopillar 104 width does not experience a monotonic increase. As shown in FIG. 1(d), there are a few ranges of widths in which the phase decreases for increasing width. This anomalous behavior stems from the excitation of guided mode resonances (as discussed below in section entitled "Guided Resonance Mode"), and provides another degree of freedom to engineer the dispersive response of each PS.

Figure 13:
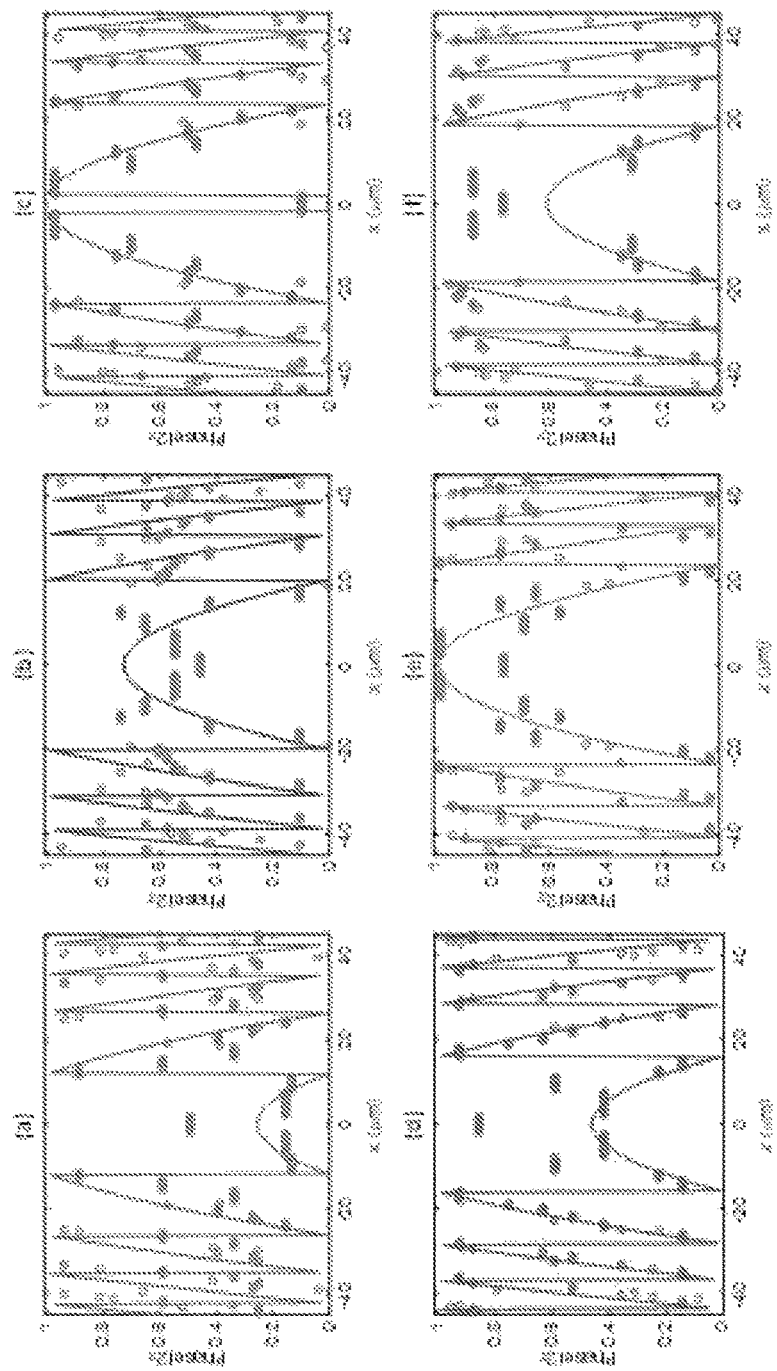
FIG. 13 illustrates plots of desired phase and realized phase at various wavelengths for an achromatic metalens such as the one shown in FIG. 1.

In one or more embodiments, an example bandwidth from 490 nm to 550 nm can be selected and discretized it into six equally spaced wavelengths. The phase at each wavelength can be calculated by Equation (1), knowing the focal length, f=485 μm, and diameter, D=200 μm, of the AML 100. The reference phase C can be different for different wavelengths and thus introduces a "knob" to minimize the difference between the implemented and desired phase simultaneously for all selected wavelengths. C can be determined by utilizing algorithms such as a particle swarm optimization algorithm. Optimized solutions are shown in FIG. 13 below, where the desired phase and the achieved phase at several wavelengths is shown.

Figure 2:
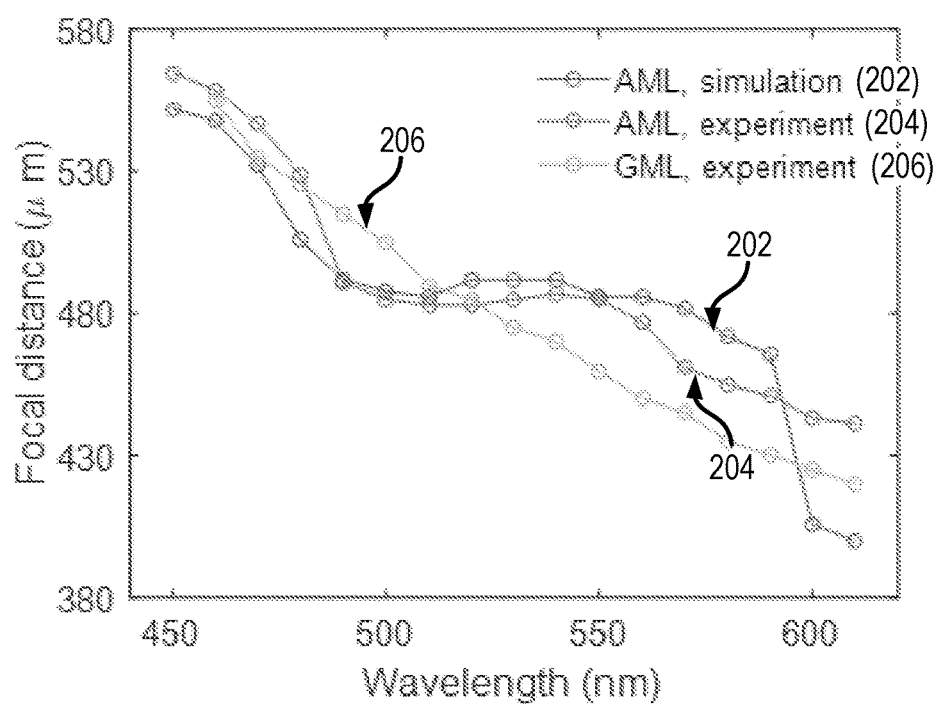
FIG. 2 shows example plots of a focal lengths of example metalens as a function of wavelength.

FIG. 2 shows example plots of a focal lengths of example metalens as a function of wavelength. For example, the plot 202 (AML simulation) shows the focal length of the AML as function of wavelength. The plot 204 (AML, experiment) shows measured focal length of the fabricated AML versus wavelength. The measured fractional change of focal length across the bandwidth (490 nm-550 nm) is 1.5% very close to that of predicted by simulation (1.2%). The AML has a diameter of 200 μm and focal length of 485 μm at $\lambda$=530 nm. The plot 206 (GML, experiment) shows the focal length of a fabricated geometric-phase based metalens (GML). The desired phase is imparted via the rotation of titanium dioxide nanofins. The use of geometric phase has a high tolerance to fabrication errors thus GML can serve as a robust reference.

In one or more embodiments, the performance of the AML 100 can be analyzed by using the Fresnel-Kirchhoff integral. In one or more embodiments, the performance of the AML 100 can be analyzed using full-wave analysis using finite-difference time-domain (FDTD) numerical analysis tools. The focal length of an AML as a function of wavelength can be calculated using the Fresnel-Kirchhoff integral method as shown in FIG. 2. The focal length is nearly constant from 490 nm to 550 nm, with a fractional change of $$1.2\% \left( \frac{\max(f) - \min(f)}{\text{mean}(f)} \times 100\% \right),$$

indicating the effectiveness of chromatic dispersion engineering approach. It is notable that previous methods, which use coupled dielectric scatterers to realize multi-wavelength achromatic metalenses, cannot be utilized here. This is due to their resonant design, which results in very different focal lengths at wavelengths away from the selected ones.

Fabrication and Characterization

A fused silica substrate 106 can be used to fabricate the AML 100. An aluminum mirror with a thickness of 110 nm (much larger than the skin depth of light in the visible) can be deposited using electron beam deposition. A 180 nm thick silicon dioxide film can be grown via plasma enhanced chemical vapor deposition. $TiO_2$ nanopillars can be fabricated using methods known in the art.

Figure 3:
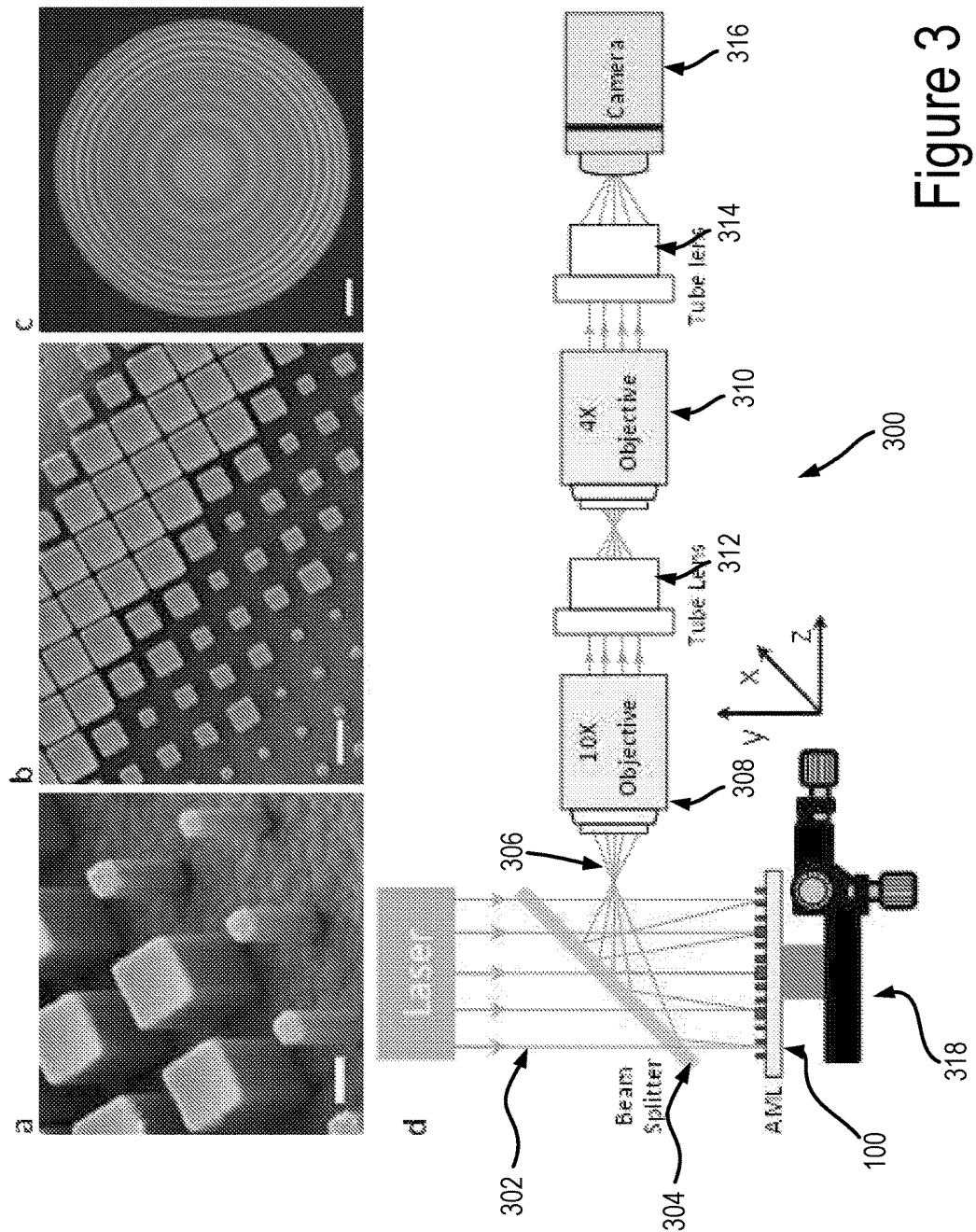
FIG. 3 illustrates images of an example fabricated achromatic metalens and an optical system using the achromatic metalens.

FIG. 3 illustrates images of an example fabricated achromatic metalens and an optical system using the achromatic metalens. In particular, FIGS. 3(a) and 3(b) show scanning electron microscope top view and side view images of an example fabricated AML 100 (Scale bar: 200 nm and 500 nm, respectively). Nanopillars with high aspect ratios, up to 7.5, and vertical side-walls can be formed. FIG. 3(c) shows an optical image formed by the AML 100 (Scale bar: 25 μm). The AML 100 can have a diameter of about 200 μm, with a focal length of about 485 μm, giving a NA of about 0.2.

FIG. 3(d) shows an optical system 300 that can be used to characterize the AML 100. First, a collimated beam 302 can be passed through a 50:50 beam splitter 304 to illuminate the AML 100. Then, a focused reflected beam 306 can be collected by the imaging system 300 via the beam splitter 304. The imaging system 300 can include two objectives (308 and 310) and their corresponding tube lenses (312 and 314), providing a magnification of 40. Due to limited space between the first objective 308 and the AML 100, a long working distance (e.g., a working distance of about 34 mm) objective (e.g., Mitutoyo M Plan Apo 10×, NA=0.28) can be selected and paired it with its tube lens 312 (focal length of 200 mm). This image can be magnified again by an objective such as a 4× objective 310 (e.g., Olympus PLN Plan Achromat 4×) paired with its tube lens 314 (e.g., having a focal length of about 180 mm) to form the final image on a camera 316 or other image sensor, such as a sCMOS camera (e.g., an Andor Zyla camera). The AML 100 can be mounted on a motorized stage 318 (having a movement step of about 100 nm) to adjust the distance between the AML 100 and first objective 306 (10× objective). Using this setup, the AML 100 can be moved in steps of 2 μm along the z-axis while recording the intensity profile in the xy-plane. By stitching these intensity profiles, the intensity profile of the reflected beam by the AML 100 in the xz-plane can be reconstructed.

Figure 4:
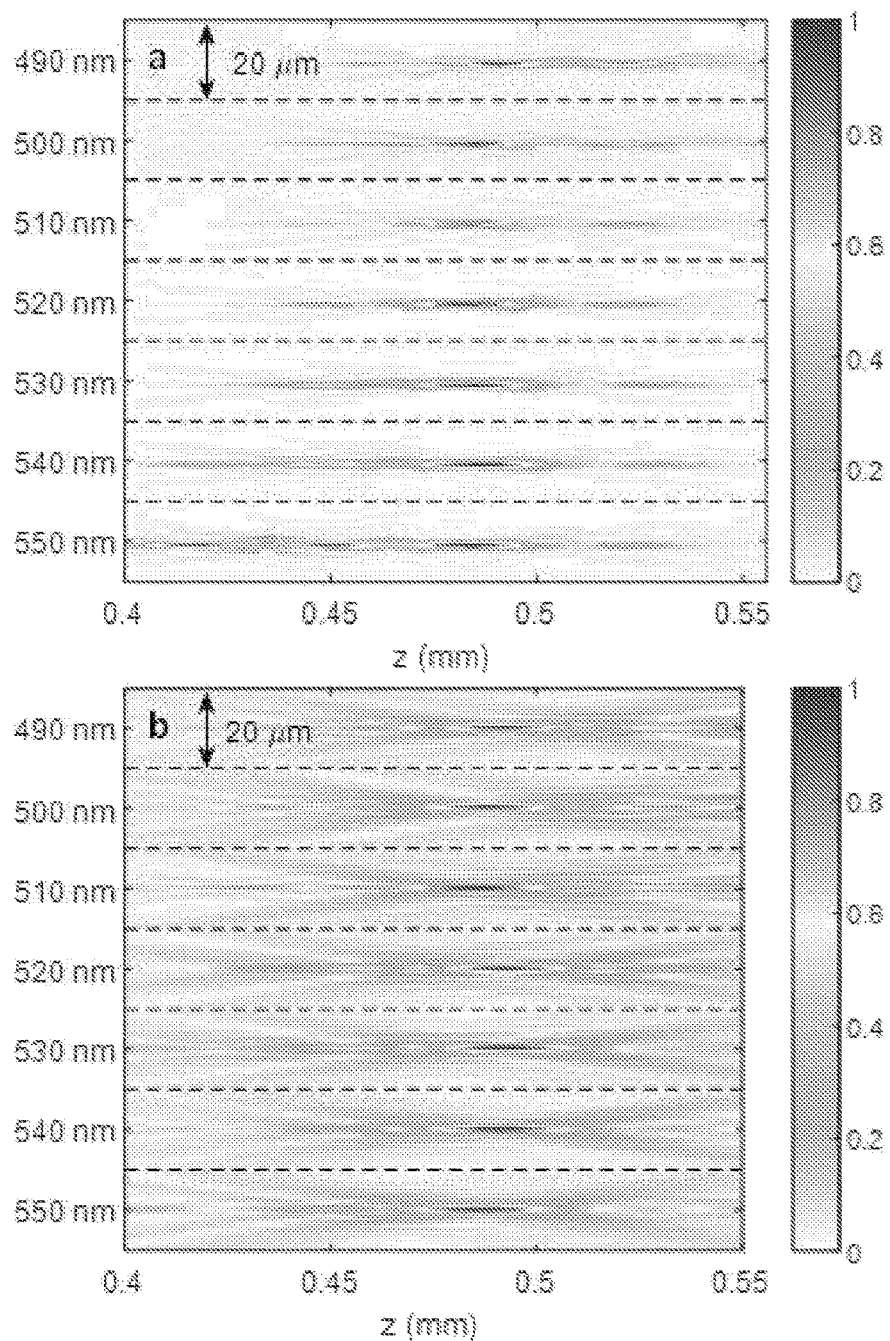
FIG. 4 shows measured and simulated intensity profiles of a light beam reflected by an achromatic metalens.
Figure 14:
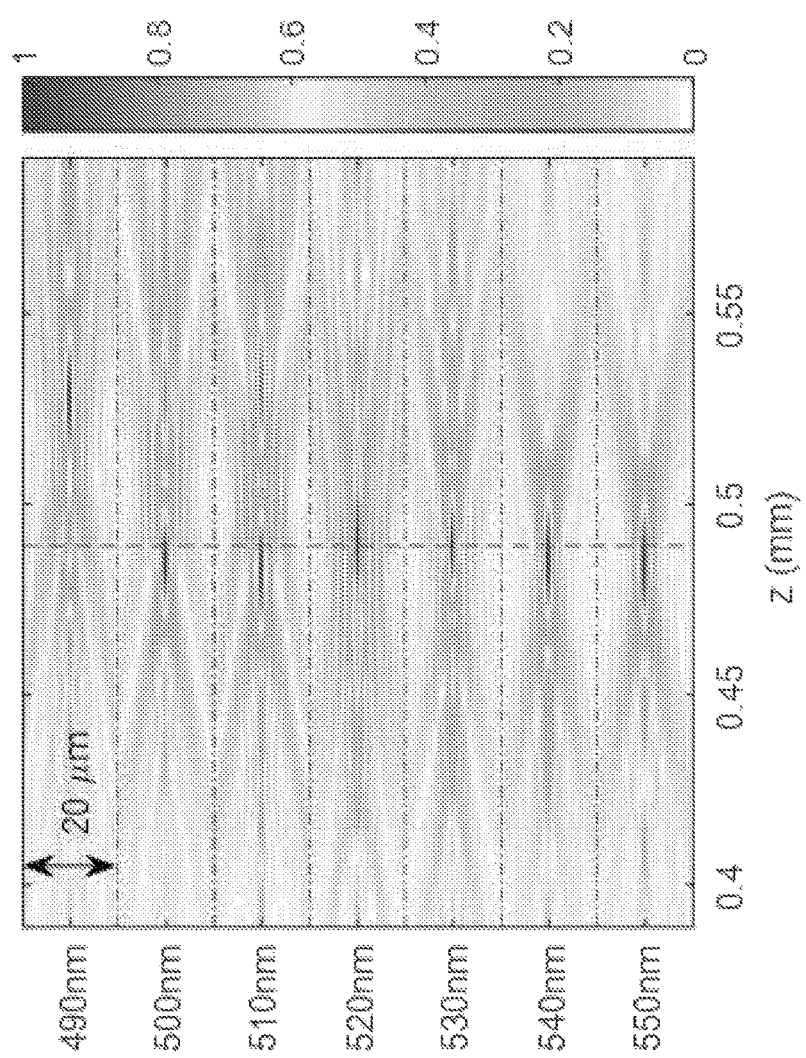
FIG. 14 illustrates simulated intensity profiles of the reflected beam by the achromatic metalens in the xz-plane at several wavelengths.

FIG. 4 shows measured and simulated intensity profiles of a light beam reflected by an achromatic metalens. In particular FIG. 4(a) shows a measured intensity profile illustrating the propagation of a reflected beam before and after the focal distance. The focal length remains unchanged for wavelengths from about 490 nm to about 550 nm. This is also evident in the measured focal length as a function of wavelength (e.g., as shown in FIG. 2). The measured focal lengths closely resemble those predicted by the simulation, in particular across the design bandwidth. In the measured intensity profiles in the xz-plane (as shown in FIG. 4(a)), secondary intensity peaks are evident before and after the focal spots, an effect which is more pronounced for wavelengths at the edge of the bandwidth. FIG. 4(b) shows a simulated intensity profile of a light beam reflected by the achromatic metalens. As shown in FIG. 4(b), intensities of secondary intensity peaks are substantially smaller than those observed in the experiment. This can imply that fabrication imperfections enhance this effect (as shown in FIG. 14, below), which can be mitigated by further optimizing the fabrication parameters including the electron beam lithography dosage. Secondary peaks in the simulations can arise due to a mismatch between the desired and realized phase profiles (as shown in FIG. 13, below).

Figure 5:
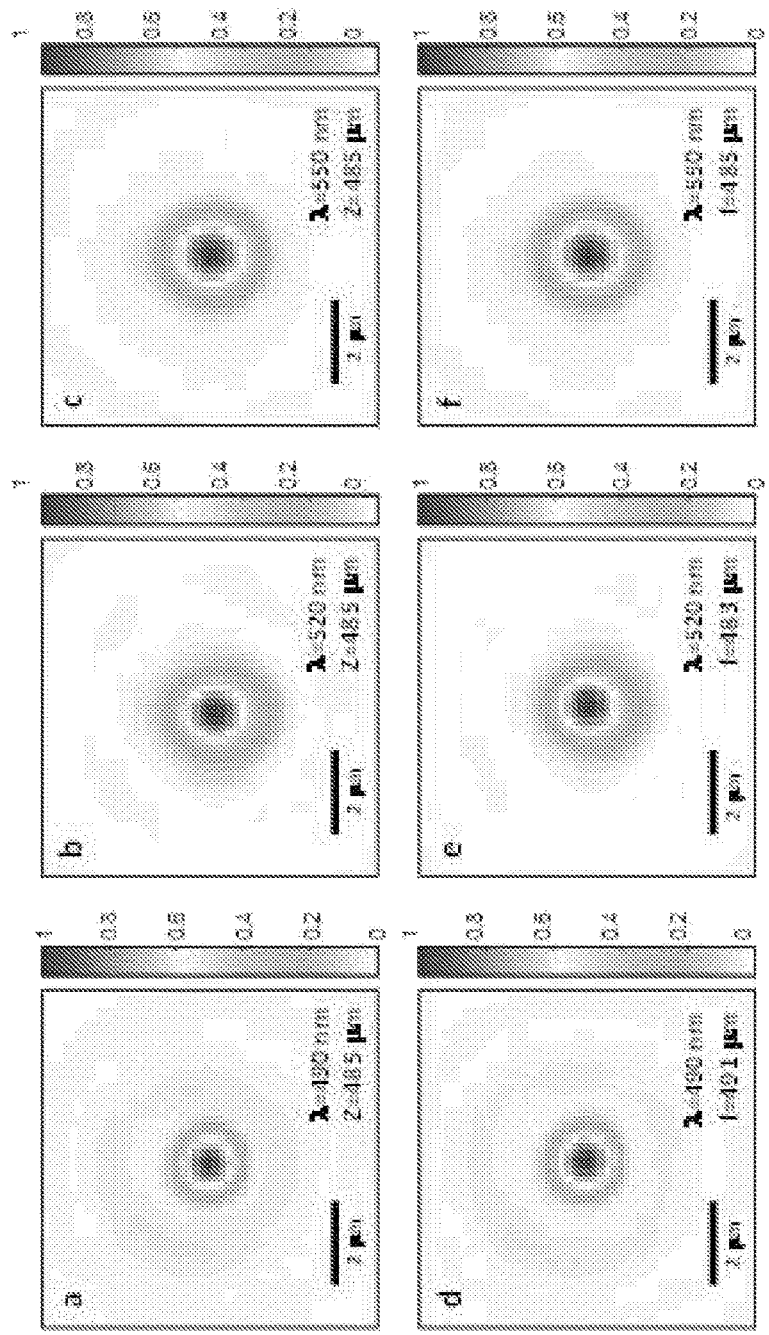
FIG. 5 shows intensity profiles of the achromatic metalens in the xy-plane at a fixed distance.

FIG. 5 shows intensity profiles of the achromatic metalens in the xy-plane at a fixed distance. In particular, FIGS. 5(a), 5(b), and 5(c) show the intensity profiles at a fixed distances of about 485 μm from the AML at wavelengths of about 490 nm, about 520 nm, and about 550 nm, respectively. FIGS. 5(d), 5(e), and 5(f) show focal spots of the AML at three wavelengths of about 490 nm, 520 nm, and 550 nm, respectively. These intensity profiles resemble the focal spots (also shown in FIG. 5, bottom row), which is consistent with the observed small change in focal lengths for the different wavelengths. The vertical (horizontal) cuts of focal spots have a full-width at half-maximum (FWHM) of 1.27 μm (1.29 μm), 1.52 μm (1.45 μm), and 1.68 μm (1.59 μm) at wavelength of 490 nm, 520 nm and 550 nm, respectively. Values of FWHMs from vertical and horizontal cuts are very close revealing the symmetry of the focal spots. The importance of dispersion engineering becomes evident when comparing these results with the measured results of a metalens based on geometric phase. Since the latter is not corrected for chromatic dispersion, as shown in FIG. 2, the focal length monotonically reduces as the wavelength increases.

Figure 6:
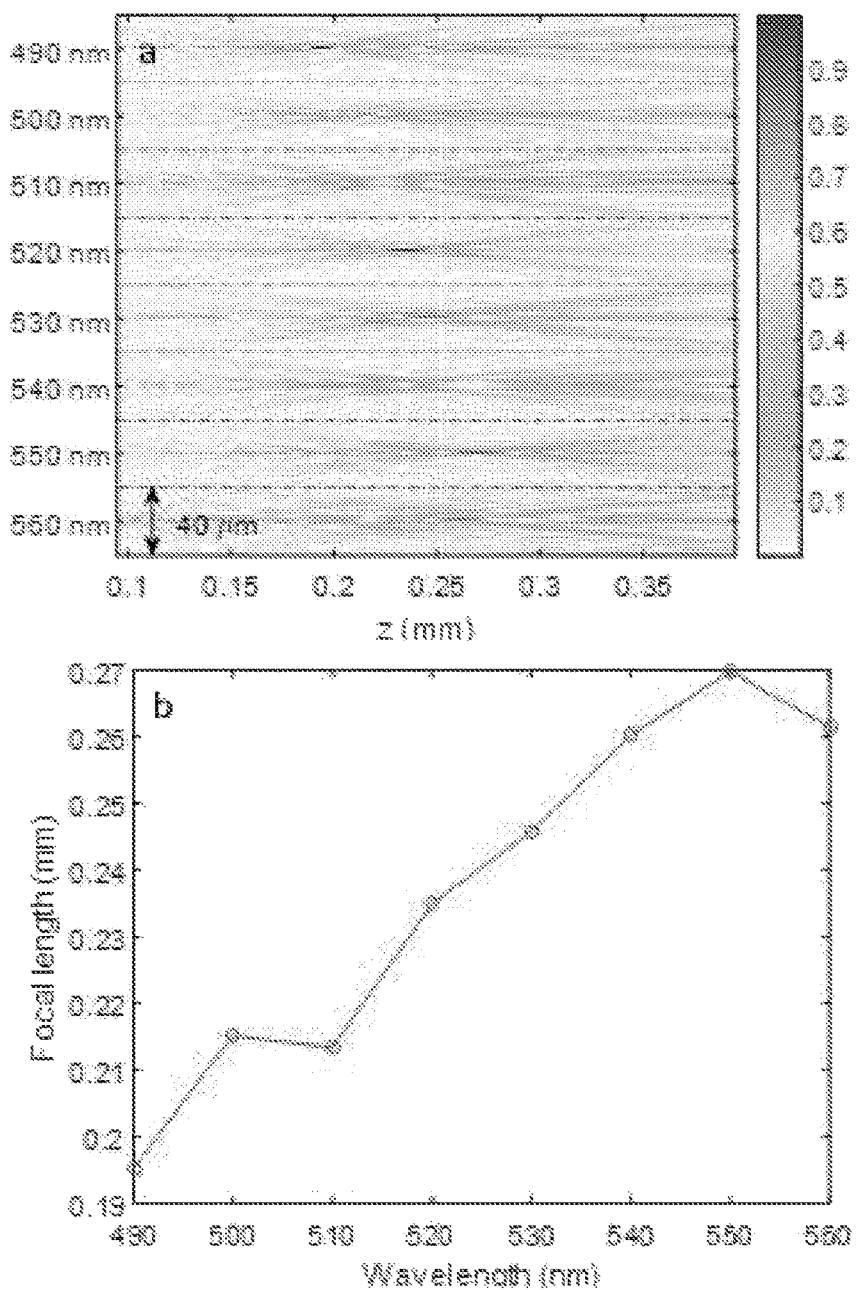
FIG. 6 shows a calculated intensity profile and a focal length plot of an achromatic metalens with reverse chromatic dispersion.

FIG. 6 shows a calculated intensity profile and a focal length plot of an achromatic metalens with reverse chromatic dispersion. In particular, FIG. 6(a) shows calculated intensity profiles of the reflected beam of a metalens in the xz-plane at different wavelengths. The wavelengths of the incident light are noted in the left side of the plot. FIG. 6(b) shows that the focal length of the AML increases with an increase in the wavelength of the light.

A metalenses with tailored chromatic dispersion is discussed herein. The subject matter also theoretically and experimentally discusses planar lenses with an achromatic response, where the focal length remains unchanged for about 60 nm bandwidth in the visible spectrum. Demonstration of achromatic metalens, along with the design of metalenses with reverse chromatic dispersion, allows breaking away from the constraints of conventional diffractive optics, offering opportunities for the development of new components with desired dispersion.

Guided Resonance Mode

Figure 7:
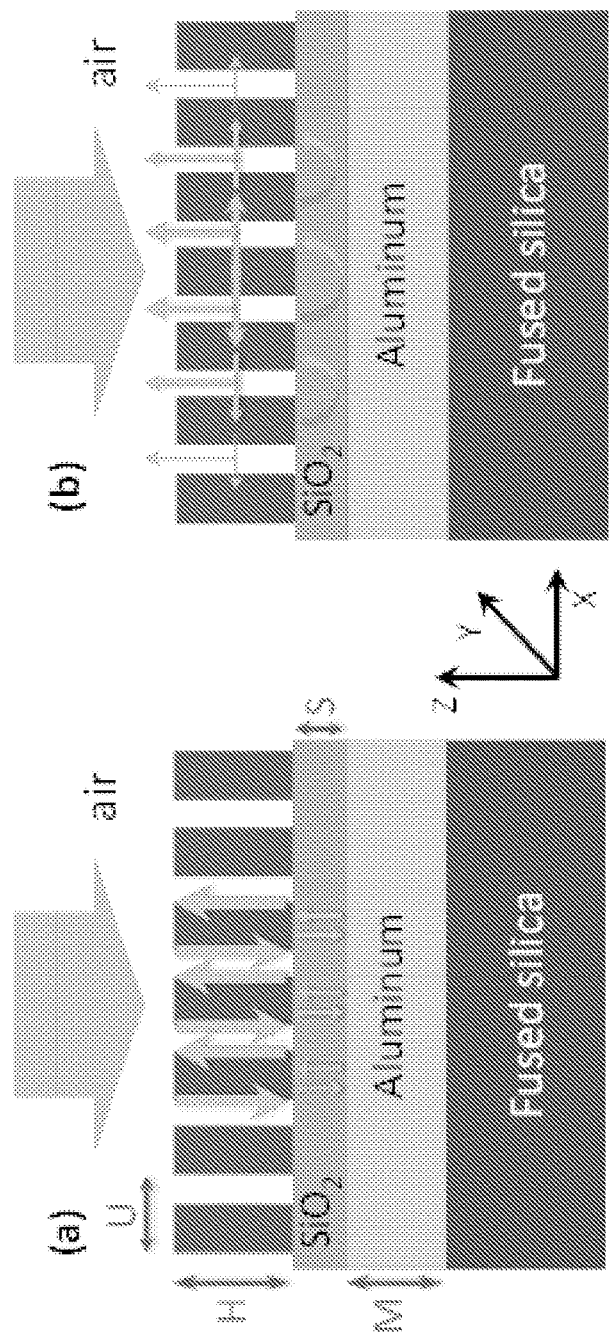
FIG. 7 shows achromatic metalenses illustrating two example optical paths.

FIG. 7 shows AMLs illustrating two example optical paths. In particular, FIG. 7(a) shows an AML illustrating a first optical path (Fabry-Perot), while FIG. 7(b) shows an AML illustrating a second optical path (guided modes) (center to center distance U=480 nm, and height H=600 nm, and the aluminum and silicon dioxide have thicknesses M and S of about 110 nm and about 180 nm, respectively). FIG. 7 shows the schematic of a TiO$_2$ array on a metallic mirror with a thin layer of silicon dioxide (spacer) in-between. Incident light (entering from air) can take two possible optical paths. In the first optical path (FIG. 7(a)), light propagates along z-axis via nanopillars and the spacer layer and then it is reflected back by the metallic mirror. In general, light can bounce several times before is coupled out to air. This can be seen as a Fabry-Perot cavity. In addition, this structure can support waveguide modes with propagation direction in x-y plane. In the latter, the array of TiO$_2$ nanopillars serves as the core of the waveguide with air and spacer as the cladding layers. This provides the second optical path (FIG. 7(b)). In order to couple into these guided modes, the phase matching condition is fulfilled. This can be done by adjusting the center-to-center distance of the nanopillars (U) such that $$k_0 = m\frac{2\pi}{U}(m: \text{integer})$$

matches the propagation constant of the corresponding guided modes (β). Therefore, U can be configured to be larger than the effective wavelength inside the waveguide core (TiO$_2$ in our case). Additionally, U can be smaller than free space wavelength to avoid higher orders diffraction into air. Due to reciprocity, these modes are intrinsically leaky and can be couple out into the air. The final amplitude and phase of reflected light is superposition of these optical paths.

Figure 8:
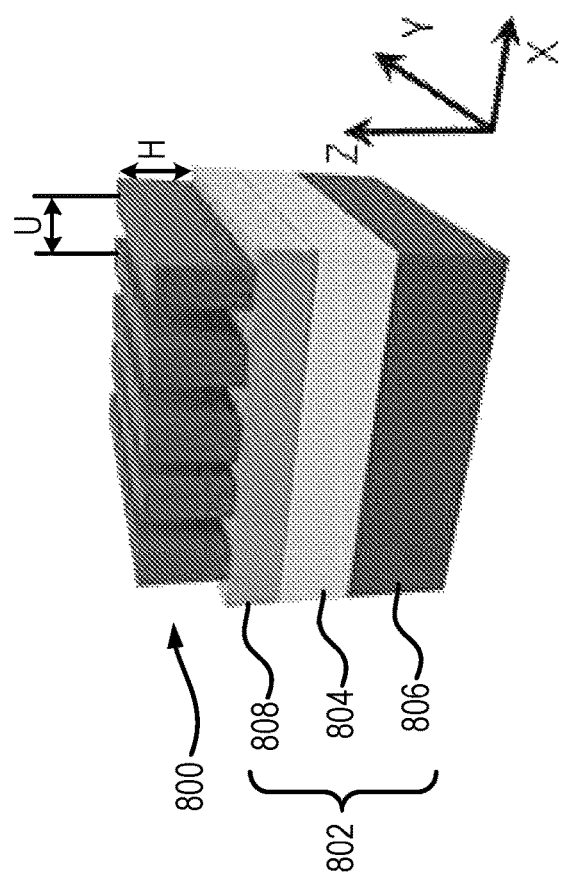
FIG. 8 shows a titanium dioxide array of nanoridges that can be used to investigate a guided mode resonance within a metalens.

FIG. 8 shows a titanium dioxide array of nanoridges 800 that can be used to investigate a guided mode resonance within a metalens. As an example, the TiO$_2$ nanoridge array can have a width (center to center distance) U of about 480 nm, and a height H of about 600 nm, on a substrate 802. The substrate 802 is an aluminum-coated 804 fused silica 806 with a thin film of silicon dioxide 808 on top. Aluminum 804 and silicon dioxide 808 have example thicknesses M=110 nm and S=180 nm, respectively. The $TiO_2$ nanoridge 800 array when viewed from the top, can appear as a two-dimensional structure that is periodic along x-axis and infinite along y-axis. First, it can be assumed the width of the $TiO_2$ nanoridge 800 is equal to U (having a filling factor f=1). In this case, there is no coupling to guided modes because the phase matching condition cannot be satisfied. Therefore, light can selectively or primarily take the first optical path. The intensity and phase of reflected light as a function of wavelength are shown in FIG. 9(a) and FIG. 9(b), respectively.

Figure 9:
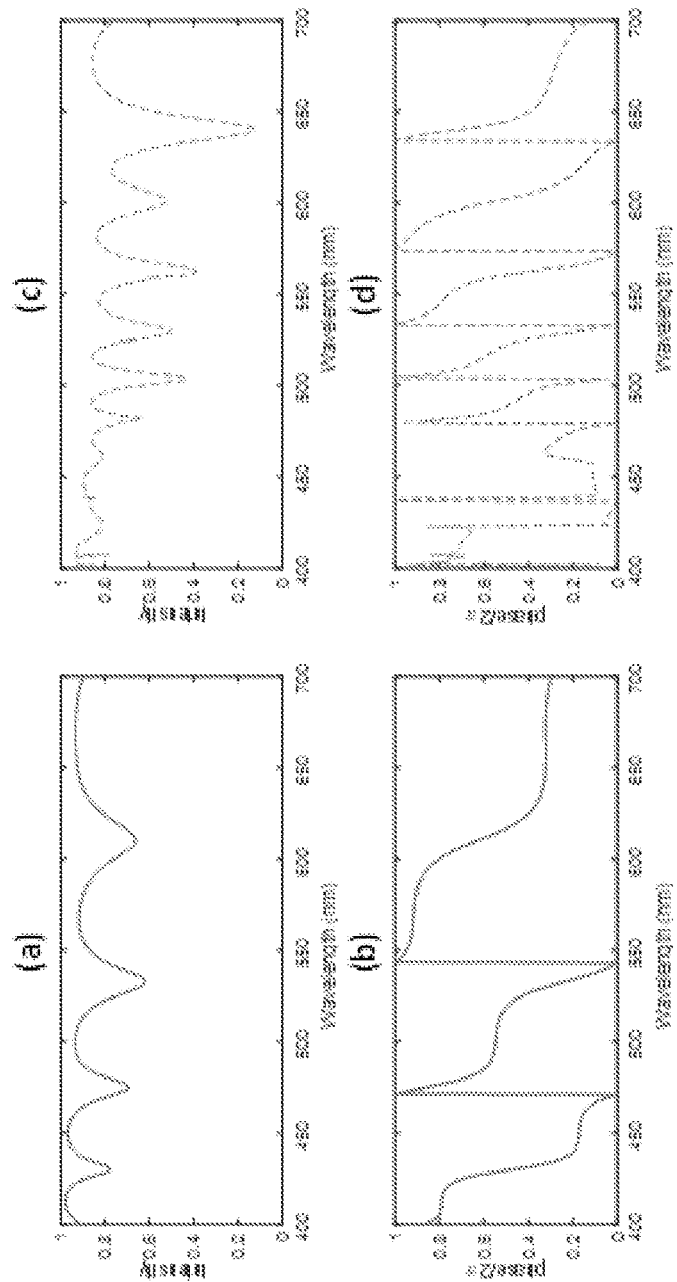
FIG. 9 shows various plots of computed intensity and phase for the nanoridges shown in FIG. 8.

FIG. 9 shows various plots of computed intensity and phase for the nanoridges shown in FIG. 8. In particular, FIG. 9 shows computed intensity (a) and phase (b) of reflected light as a function of wavelength for f=1, and computed intensity (c) and phase (d) of reflected light as a function of wavelength for f=0.916 (the polarization of incident light is along y-axis). The Fabry-Perot resonances result in several dips in reflection. By reducing the width, thus introducing periodicity, the guided mode resonances (f<1) can be excited. This is evident in the reflection curve of FIG. 9(c), where several sharp resonances appear at the filing factor of 0.916 (W=0.916U, W=440 nm, U=480 nm). These resonances also have large effects on the phase compared to the previous case. They not only expand the phase coverage, but also result in anomalous dispersion, where the first derivative of the phase with respect to wavelength changes sign around the resonance wavelength.

Figure 10:
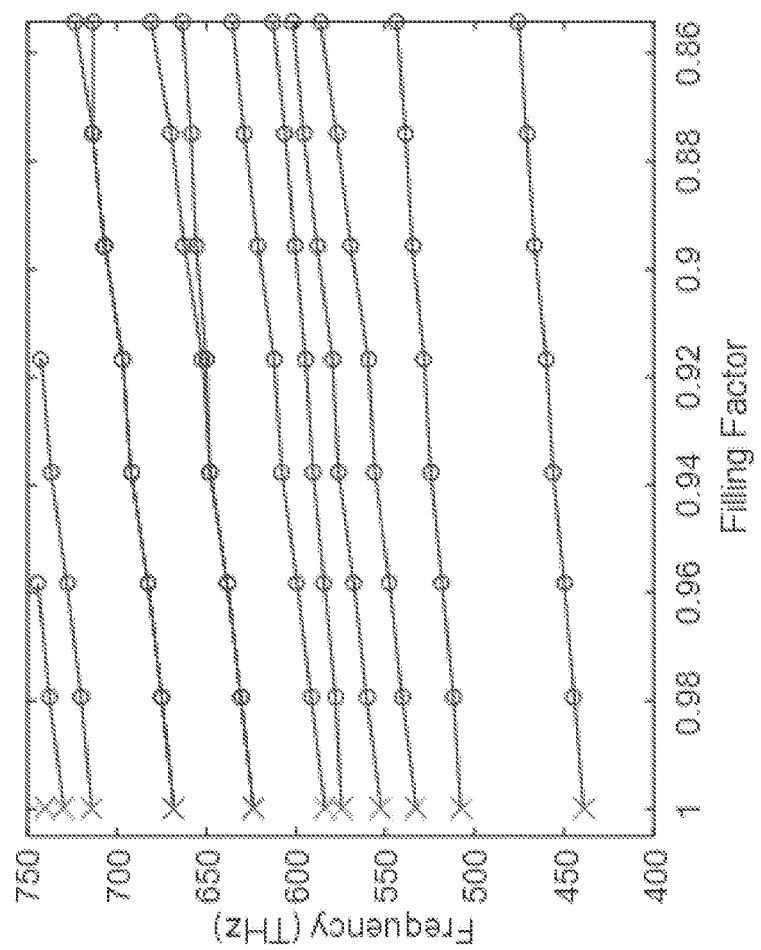
FIG. 10 shows frequencies of guided mode resonance at various filling factors.

FIG. 10 shows frequencies of guided mode resonance at various filling factors. In particular, FIG. 10 shows a frequency of guided mode resonance at different filing factors calculated by the finite difference time domain simulation (FDTD) method. Crosses, to the left of the plot, indicate frequencies of the waveguide modes corresponding to the propagation constant ($\beta$=m $2\pi$/U, m:integer) for filing factor f=1. This is calculated by Transfer Matrix method. To verify the guide mode resonance nature of these resonances, the resonance frequencies for different filling factors using finite difference time domain simulation (FIG. 10) can be calculated considering periodic boundary condition along the x-axis and perfectly matched layer along the z-axis.

Figure 11:
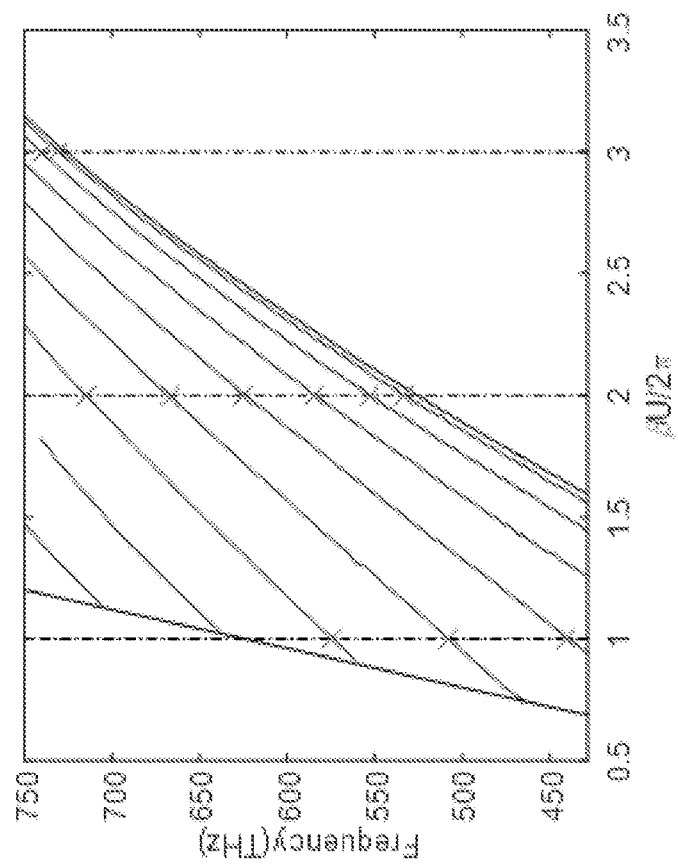
FIG. 11 shows a plot illustrating a dispersion relation of the waveguide modes.

FIG. 11 shows a plot illustrating a dispersion relation of the waveguide modes. In particular, FIG. 11 shows a plot of the dispersion relation of the waveguide modes for f=1. Crosses show frequencies of the waveguide modes corresponding to the propagation constant ($\beta$=m $2\pi$/U, m:integer), and correspond to the crosses shown in FIG. 10. The guided mode resonance frequencies in the weak perturbation limit (filling factor approaches unity) approach those of the waveguide modes with propagation constant $\beta$=m $2\pi$/U (calculated by Transfer Matrix method). This confirms the assumption that the resonances seen in simulation come from the excitation of guided modes.

Figure 12:
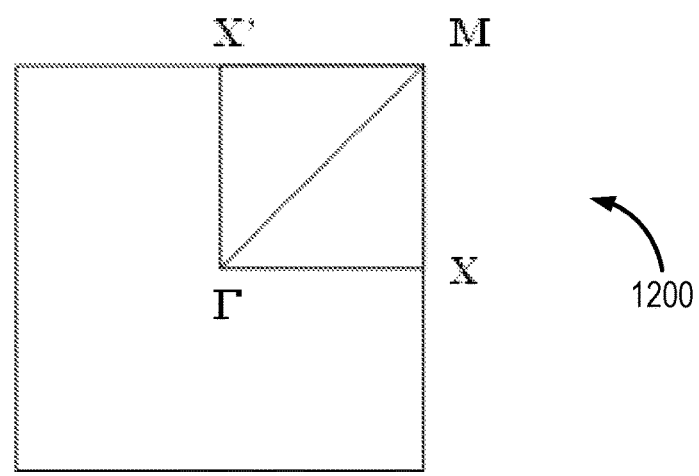
FIG. 12 illustrates a Brillouin zone for an achromatic metalens such as the one shown in FIG. 1.

FIG. 12 illustrates a Brillouin zone 1200 for the AML such as the one shown in FIG. 1 above. For simplicity, 2D case has been considered. The extension to 3D is straightforward, and the physical origin of the resonances is essentially the same. In the 3D case, the structure becomes a photonic crystal slab on top of a mirror. Since the Brillouin zone is expanded there is more than one direction that has periodicity ($\Gamma$X, $\Gamma$X', $\Gamma$M). Therefore, coupling into guided modes can happen in all three directions, giving rise to more complex resonance spectrum.

FIG. 13 illustrates plots of desired phase and realized phase at various wavelengths for an achromatic metalens such as the one shown in FIG. 1. In particular, FIG. 13 shows Desired phase (solid line) and realized phase (circles) at six wavelengths (a) 490 nm, (b) 505 nm, (c) 520 nm, (d) 535 nm, (e) 550 nm, and (f) 565 nm. It is notable that the reference phase (the desired phase at the center of the achromatic metalens (x=y=0)) is different at each design wavelength as discussed above.

FIG. 14 illustrates simulated intensity profiles of the reflected beam by the achromatic metalens in the xz-plane at several wavelengths. Here, a systematic fabrication error has been considered where all nanopillar widths are 10 nm larger than the designed values. This results in an enhancement of secondary intensity peaks compared to those in FIG. 4(b) of the manuscript. This effect is clearer at $\lambda$=490 nm where the previous secondary peak in the FIG. 4(b) become the primary peak here.

As used herein, the singular terms "a," "an," and "the" may include plural referents unless the context clearly dictates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a characteristic can be deemed to be "substantially" constant if a largest deviation of the characteristic from an average value of the characteristic is less than or equal to ±10% of the average value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device comprising:
  a substrate;
  a reflective layer disposed over the substrate; and
  a metalens disposed over the reflective layer, wherein the metalens includes a plurality of nanopillars, the plurality of nanopillars together specifying a phase profile such that the metalens has a focal length that is substantially constant over a wavelength range of an incident light of about 490 nm to about 550 nm.

2. The optical device of claim 1, wherein the phase profile of the metalens is such that the focal length of the metalens increases with an increase in the wavelength of the incident light.

3. The optical device of claim 1, wherein the nanopillars have a square cross-sectional area.

4. The optical device of claim 1, wherein a ratio of a height of the plurality of nanopillars over a width of the plurality of nanopillars is greater than 1.

5. The optical device of claim 1, wherein a center-to-center distance between any two adjacent nanopillars of the plurality of nanopillars is greater than the wavelength range of the incident light.

6. The optical device of claim 1, wherein the focal length of the metalens is insensitive to a polarization of the incident light.

7. The optical device of claim 1, further comprising:
  a silicon dioxide layer disposed over the reflective layer, wherein the substrate includes a fused silica layer.

8. The optical device of claim 7, wherein a thickness of the reflective layer is about 110 nm, and a thickness of the silicon dioxide layer is about 180 nm.

9. An imaging system, comprising:
  a metalens structure, including:
    a substrate;
    a reflective layer disposed over the substrate; and
    a metalens disposed over the reflective layer, wherein the metalens includes a plurality of nanopillars, the plurality of nanopillars together specifying a phase profile such that the metalens has a focal length that is substantially constant over a wavelength range of an incident light of about 490 nm to about 550 nm;
  a beam splitter configured to receive the incident light reflected from the metalens, and reflect the received incident light; and
  an image sensor positioned to receive the incident light reflected by the beam splitter.

10. The imaging system of claim 9, wherein the phase profile of the metalens is such that the focal length of the metalens increases with an increase in the wavelength of the incident light.

11. The imaging system of claim 9, wherein the nanopillars have a square cross-sectional area.

12. The imaging system of claim 9, wherein a ratio of a height of the plurality of nanopillars over a width of the plurality of nanopillars is greater than 1.

13. The imaging system of claim 9, wherein a center-to-center distance between any two adjacent nanopillars of the plurality of nanopillars is greater than the wavelength range of the incident light.

14. The imaging system of claim 9, wherein the focal length of the metalens is insensitive to a polarization of the incident light.

15. The imaging system of claim 9, wherein the metalens structure further includes:
  a silicon dioxide layer disposed over the reflective layer, wherein the substrate includes a fused silica layer.

16. The imaging system of claim 15, wherein a thickness of the reflective layer is about 110 nm, and a thickness of the silicon dioxide layer is about 180 nm.

* * * * *